United States Patent
Lee et al.

(10) Patent No.: US 10,752,968 B2
(45) Date of Patent: *Aug. 25, 2020

(54) ULTRAHIGH-STRENGTH HIGH-DUCTILITY STEEL SHEET HAVING EXCELLENT YIELD STRENGTH, AND MANUFACTURING METHOD THEREFOR

(71) Applicant: POSCO, Pohang-si (KR)

(72) Inventors: Kyoo-Young Lee, Gwangyang-si (KR); Joo-Hyun Ryu, Gwangyang-si (KR); Sea-Woong Lee, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/304,476

(22) PCT Filed: May 18, 2017

(86) PCT No.: PCT/KR2017/005160
§ 371 (c)(1),
(2) Date: Nov. 26, 2018

(87) PCT Pub. No.: WO2017/222189
PCT Pub. Date: Dec. 28, 2017

(65) Prior Publication Data
US 2019/0292615 A1 Sep. 26, 2019

(30) Foreign Application Priority Data

Jun. 21, 2016 (KR) .................. 10-2016-0077463

(51) Int. Cl.
*C21D 8/02* (2006.01)
*C21D 9/46* (2006.01)
(Continued)

(52) U.S. Cl.
CPC .......... *C21D 8/0247* (2013.01); *B32B 15/012* (2013.01); *B32B 15/013* (2013.01);
(Continued)

(58) Field of Classification Search
None
See application file for complete search history.

(56) References Cited

U.S. PATENT DOCUMENTS

2006/0162824 A1  7/2006 Merwin
2013/0295402 A1  11/2013 Oh et al.
(Continued)

FOREIGN PATENT DOCUMENTS

CN  1769509  5/2006
CN  101638749  1/2011
(Continued)

OTHER PUBLICATIONS

European Search Report—European Application No. 17815602.2, dated Apr. 11, 2019, citing WO 2016/063467, WO 2016/001703, EP 2 778 247, EP 3 009 527, WO 2009/142362, EP 2 660 345, CN 102 912 219 and JP 2014 025091.
(Continued)

*Primary Examiner* — Jenny R Wu
(74) *Attorney, Agent, or Firm* — Cantor Colburn LLP

(57) ABSTRACT

Provided is an ultrahigh-strength high-ductility steel sheet having excellent yield strength, comprising, by wt %, 0.04-0.18% of C, 2% or less of Si, 4-10% of Mn, 0.05% or less of P (except 0%), 0.02% or less of S (except 0%), 0.5% or less of Al (except 0%), 0.02% or less of N (except 0%) and the balance of Fe and the other inevitable impurities, wherein Si+Mn satisfies 6-10% and the microstructure comprises, by volume fraction, 12% or more of retained austenite and 60% or more of annealed martensite.

8 Claims, 3 Drawing Sheets

(51) Int. Cl.

| | | |
|---|---|---|
| *C22C 38/00* | (2006.01) | |
| *C22C 38/02* | (2006.01) | |
| *C22C 38/04* | (2006.01) | |
| *C22C 38/06* | (2006.01) | |
| *C22C 38/12* | (2006.01) | |
| *C22C 38/14* | (2006.01) | |
| *C21D 6/00* | (2006.01) | |
| *C23C 2/06* | (2006.01) | |
| *C23C 2/12* | (2006.01) | |
| *B32B 15/01* | (2006.01) | |
| *C23C 2/02* | (2006.01) | |
| *C23C 2/40* | (2006.01) | |

(52) U.S. Cl.
CPC ............ *C21D 6/005* (2013.01); *C21D 8/02* (2013.01); *C21D 9/46* (2013.01); *C22C 38/00* (2013.01); *C22C 38/001* (2013.01); *C22C 38/02* (2013.01); *C22C 38/04* (2013.01); *C22C 38/06* (2013.01); *C22C 38/12* (2013.01); *C22C 38/14* (2013.01); *C23C 2/02* (2013.01); *C23C 2/06* (2013.01); *C23C 2/12* (2013.01); *C23C 2/40* (2013.01); *C21D 8/0205* (2013.01); *C21D 8/0226* (2013.01); *C21D 8/0236* (2013.01); *C21D 2211/001* (2013.01); *C21D 2211/008* (2013.01)

(56) References Cited

U.S. PATENT DOCUMENTS

| | | |
|---|---|---|
| 2014/0230971 A1 | 8/2014 | Kawasaki et al. |
| 2014/0360632 A1 | 12/2014 | Hasegawa et al. |
| 2016/0177427 A1 | 6/2016 | Takashima et al. |
| 2016/0333448 A1 | 11/2016 | Hayashi et al. |
| 2017/0051378 A1 | 2/2017 | Lee et al. |
| 2017/0130286 A1 | 5/2017 | Hayashi |
| 2017/0137909 A1* | 5/2017 | Xu .................... C21D 6/005 |
| 2017/0306437 A1 | 10/2017 | Nakagawa et al. |

FOREIGN PATENT DOCUMENTS

| | | |
|---|---|---|
| CN | 102912219 | 2/2013 |
| CN | 103060678 | 4/2013 |
| CN | 103392022 | 11/2013 |
| CN | 103890202 | 6/2014 |
| CN | 105648317 | 6/2016 |
| EP | 2660345 | 11/2013 |
| EP | 2778247 | 9/2014 |
| EP | 3009527 | 4/2016 |
| JP | 07188834 | 7/1995 |
| JP | 2006212663 | 8/2006 |
| JP | 2014025091 | 2/2014 |
| KR | 20050032721 | 4/2005 |
| KR | 20120070739 | 7/2012 |
| KR | 20120073407 | 7/2012 |
| KR | 20130076959 | 7/2013 |
| KR | 20140060574 | 5/2014 |
| KR | 20140075789 | 6/2014 |
| KR | 20150130612 | 11/2015 |
| KR | 20160047465 | 5/2016 |
| WO | 2009142362 | 11/2009 |
| WO | 2013038637 | 3/2013 |
| WO | 2015102050 | 7/2015 |
| WO | 2016001703 | 1/2016 |
| WO | 2016010144 | 1/2016 |
| WO | 2016063467 | 4/2016 |

OTHER PUBLICATIONS

International Search Report—PCT/KR2017/005160 dated Aug. 2, 2017.

Japanese Office Action—Japanese Application No. 2018-566477 dated Jan. 7, 2020, citing WO 2015/102050, WO 2016/010144, US 2006/0162824, CN 102912219, CN 105648317, KR 10-2005-0032721, Merwin, and Han.

Chinese Office Action—Chinese Application No, 201780037938.2 dated Apr. 14, 2020, citing CN103890202, CN103392022, CN1769509, CN101638749, and US2014/0230971.

* cited by examiner (a)

(b)

ULTRAHIGH-STRENGTH HIGH-DUCTILITY STEEL SHEET HAVING EXCELLENT YIELD STRENGTH, AND MANUFACTURING METHOD THEREFOR

TECHNICAL FIELD

The present disclosure relates to an ultrahigh-strength high-ductility steel sheet having excellent yield strength and a method for manufacturing the same.

BACKGROUND ART

In order to reduce the weight of a steel sheet for a vehicle, a thickness of the steel sheet is required to be reduced. Meanwhile, in order to secure impact safety, a thickness of a steel sheet is required to be increased. In this regard, it is contradictory to secure both lighter weight and impact safety.

In order to solve this issue, it is necessary to increase the strength of a material while increasing formability thereof. This is known to be possible through various steel sheets for a vehicle such as a dual phase steel (DP steel), transformation induced plasticity steel (TRIP steel), complex phase steel (CP steel), and the like known as advanced high strength steel (AHSS).

Strength may be increased by increasing an amount of carbon in advanced high strength steel or adding an alloy element. However, considering practical aspects such as spot weldability, and the like, tensile strength to be achieved is limited to a level of about 1200 MPa.

Techniques according to the related art for achieving the product of tensile strength and elongation of 23,000 MPa % or more, have been variously developed.

In Patent Document 1, steel, containing Mn of 3.5 wt % to 9.0%, is used, thereby securing significantly excellent material properties. For example, the product of tensile strength and elongation is 30,000 MPa % or more. Meanwhile, a yield ratio is low as a level of 0.43 to 0.65, and a maximum yield strength is also low as a level of 720 MPa. Thus, there is a disadvantage in that it is difficult to compete with 1.5G-grade hot press forming (HPF) steel according to the related art having a yield strength of 1050 MPa after heat treatment.

In Patent Document 2, in a dual-phase steel, containing Mn of 2 wt % to 9%, and obtained by reverse transformation, thermal deformation occurs within a temperature range of 100° C. to Ac1+50° C. to refine a grain, and thus low temperature toughness is improved. As a result, there is an advantage in that yield strength is improved, but there may be a disadvantage in that warm transformation is performed at the end of a manufacturing process. Moreover, in the case of Patent Document 2, final annealing is performed in a batch annealing furnace (BAF), in which long time heat treatment is performed, so there may be a problem in which L-curvature of a final product is inferior, and shape properties are poor.

In Patent Document 3, a manufacturing method, in which continuous annealing is possible by increasing Ac1 temperature by adding Al to steel containing Mn of 3 wt % to 7%, is proposed. However, there may be a disadvantage in that it is difficult to secure continuous casting workability due to the addition of Al.

Meanwhile, in Patent Documents 4 and 5, a method for manufacturing a high strength steel sheet, in which tensile strength is 980 MPa or more, and the product of tensile strength and elongation is 24000 MPa % or more, using steel containing Mn of 3.5 wt % to 10%, is proposed. Here, coiling is performed at Ac1 transformation point or less after hot rolling, so it is inhibited that austenite is increased and annealed martensite is formed through first partitioning of Mn. Thus, there may be a disadvantage in that cold transformation properties are not effectively secured. Moreover, final annealing and intermediate annealing are only performed in two phase regions. Thus, it is determined that differences in hardness between ferrite and other phases in a final structure are significant, and thus it is also determined that degradation of yield strength of a final product may be caused. Moreover, in Patent Documents 4 and 5, there is no mention of yield strength, and bendability is only evaluated. Thus, a manufacturing method not suitable for complex press forming, but suitable for actual simple component forming, is proposed.

PRIOR ART DOCUMENT

Patent Document 1: Chinese Patent Publication No. 101638749

Patent Document 2: Chinese Patent Publication No. 103060678

Patent Document 3: Republic of Korea Laid-Open Patent Application Publication No. 2012-0070739

Patent Document 4: Republic of Korea Laid-Open Patent Application Publication No. 2014-0060574

Patent Document 5: International Application No. PCT-JP2012-005706

DISCLOSURE

Technical Problem

An aspect of the present disclosure may provide a ultrahigh strength high ductility steel sheet, in which the product of tensile strength and elongation is excellent, in which yield strength is excellent and it is easily applied to an impact structural member, and which is suitable for cold press forming due to excellent shape properties, and a method for manufacturing the same.

Technical Solution

According to an aspect of the present disclosure, an ultrahigh-strength high-ductility steel sheet having excellent yield strength, includes: carbon (C): 0.04 wt % to 0.18 wt %, silicon (Si): 2 wt % or less, manganese (Mn): 4 wt % to 10 wt %, phosphorous (P): 0.05 wt % or less (excluding 0 wt %), sulfur (S): 0.02 wt % or less (excluding 0 wt %), aluminum (Al): 0.5 wt % or less (excluding 0 wt %), nitrogen (N): 0.02 wt % or less (excluding 0 wt %), and the balance of iron (Fe) and other inevitable impurities, wherein Si+Mn satisfies 6 wt % to 10 wt %, and a microstructure includes, by volume fraction, retained austenite of 12% or more and annealed martensite of 60% or more.

According to another aspect of the present disclosure, a method for manufacturing an ultrahigh-strength high-ductility steel sheet having excellent yield strength, includes: heating a slab including carbon (C): 0.04 wt % to 0.18 wt %, silicon (Si): 2 wt % or less, manganese (Mn): 4 wt % to 10 wt %, phosphorous (P): 0.05 wt % or less (excluding 0 wt %), sulfur (S): 0.02 wt % or less (excluding 0 wt %), aluminum (Al): 0.5 wt % or less (excluding 0 wt %), nitrogen (N): 0.02 wt % or less (excluding 0 wt %), and the balance of iron (Fe) and other inevitable impurities, and in which Si+Mn satisfies 6 wt % to 10 wt %, within a temperature range of 1100° C. to 1300° C.; obtaining a hot-rolled steel sheet by hot finish rolling the heated slab within a temperature range of Ar3 to 1000° C.; coiling the hot-rolled steel sheet at a temperature of 720° C. or less; heat-treating the coiled hot-rolled steel sheet within a temperature range of Ac1 to Ac1+(Ac3−Ac1)/2 for 30 minutes or more; obtaining a cold-rolled steel sheet by cold rolling the heat-treated hot-rolled steel sheet; primary annealing for cooling after the cold-rolled steel sheet is maintained at a temperature of Ac3 or more for 30 seconds or more; and secondary annealing for cooling after the primary annealed cold-rolled steel sheet is maintained within a temperature range of 580° C. to Tmax for 10 seconds to 5 minutes, where Tmax=667.64+129.1C−6.51Mn+38.52Si+29.3Al$^{1.6}$, and, in the formula, each element symbol represents the content of each element in wt %.

Advantageous Effects

According to an exemplary embodiment in the present disclosure, an ultrahigh strength high ductility steel sheet, in which the product of the tensile strength and the elongation is excellent, and in which yield strength is excellent to be easily applied to an impact structural member, and which is suitable for cold press forming due to excellent shape properties, and a method for manufacturing the same may be provided.

BEST MODE FOR INVENTION

Figure 1:
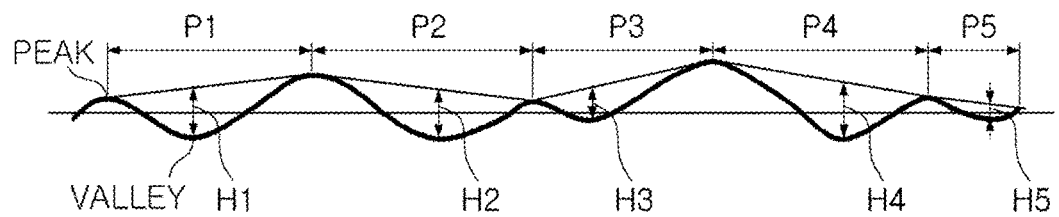
FIG. 1 is a schematic view illustrating a shape of a steel sheet.

Hereinafter, preferred embodiments of the present disclosure will be described. However, the embodiments of the present disclosure can be modified to have various other forms, and the scope of the present disclosure is not limited to the embodiments described below. Further, the embodiments of the present disclosure are provided to more fully explain the present disclosure to those skilled in the art.

Hereinafter, an ultrahigh-strength high-ductility steel sheet having excellent yield strength according to an aspect of the present disclosure will be described in detail.

An ultrahigh-strength high-ductility steel sheet having excellent yield strength according to an aspect of the present disclosure includes C: 0.04 wt % to 0.18 wt %, Si: 2 wt % or less, Mn: 4 wt % to 10 wt %, P: 0.05 wt % or less (excluding 0 wt %), S: 0.02 wt % or less (excluding 0 wt %), Al: 0.5 wt % or less (excluding 0 wt %), N: 0.02 wt % or less (excluding 0 wt %), and the balance of iron (Fe) and other inevitable impurities, and Si+Mn satisfies 6 wt % to 10 wt %, and a microstructure includes, by volume fraction, retained austenite of 12% or more and annealed martensite of 60% or more.

First, the alloy composition of the present disclosure will be described in detail. Here, the content of each element means weight % unless otherwise specified.

Carbon (C): 0.04% to 0.18%

Carbon (C) is an important element added for stabilization of the retained austenite, and C is added in an amount of 0.04% or more. However, if the content of C exceeds 0.18%, when Mn is contained in a large amount as in the present disclosure, spot weldability, a main welding technique of vehicle structural members, may be degraded. Thus, it is preferable that the content of C is 0.04% to 0.18%.

Silicon (Si): 2% or Less

Silicon (Si) is an element suppressing precipitation of a carbide in ferrite and promoting diffusion of carbon in ferrite into austenite, and contributes to the stabilization of the retained austenite.

If the content of Si exceeds 2%, hot rolling properties and cold rolling properties may be significantly degraded. Moreover, a Si oxide may be formed on a surface of steel, so hot-dip plating properties may be degraded. Thus, the content of Si is preferably limited to 2% or less.

Meanwhile, in the present disclosure, the content of Si may be 0%. In this regard, because the content of Mn is contained in a large amount as described later, stability of retained austenite may be easily secured without addition of Si.

Manganese (Mn): 4% to 10%

Manganese (Mn) is an element the most widely used in transformation steel for formation and stabilization of retained austenite and suppression of ferrite transformation upon cooling.

If the content of Mn is less than 4%, ferrite transformation may easily occur, and austenite may be insufficiently secured. Thus, it is difficult to secure 23,000 MPa % or more of TSxEl in the present disclosure. If the content of Mn exceeds 10%, it is difficult to perform continuous-continuous casting and to stably secure productivity such as a decrease at a temperature of molten steel, caused by an input of a large amount of a ferroalloy. Thus, it is preferably that the content of Mn is 4% to 10%.

Si+Mn: 6% to 10%

Si and Mn are added to satisfy not only the range of respective element contents, described above, but also the content of 6% to 10%.

If the content of Si+Mn is less than 6%, stabilization of austenite may be insufficient. If the content of Si+Mn exceeds 10%, a yield ratio may be lowered. Thus, there may be a problem that it may not be preferably applied to a structural member for a vehicle.

Phosphorous (P): 0.05% or Less (Excluding 0%)

Phosphorous (P) is a solid solution strengthening element. However, if the content of P exceeds 0.05%, weldability may be lowered, and a risk of brittleness occurring in steel may be increased. Thus, the content of P is preferably limited to 0.05% or less, more preferably, 0.02% or less.

Sulfur (S): 0.02% or Less (Excluding 0%)

Sulfur (S) is an impurity element in steel, like P, and is an element inhibiting ductility and weldability of a steel sheet. If the content of S exceeds 0.02%, ductility and weldability of a steel sheet may be inhibited. Thus, an upper limit of S is preferably limited to 0.02%.

Aluminum (Al): 0.5% or Less (Excluding 0%)

Aluminum (Al) is also an element contributing to stabilization of retained austenite by suppressing formation of a carbide in ferrite. However, if the content of Al is significant, it may be difficult to manufacture a proper slab through a reaction with a mold flux during casting, and a problem in which hot-dip plating properties are degraded by formation of an oxide on a surface may occur. In addition, Al is an element of increasing Ac1. In the present disclosure, as described below, while heat treatment at two phase regions is performed, a secondary annealing temperature is limited to 580° C. to Tmax. Thus, an upper limit of the content of Al is preferably limited to 0.5%.

Nitrogen (N): 0.02% or Less (Excluding 0%)

Nitrogen (N) is an element effective for stabilizing austenite. However, if the content of N exceeds 0.02%, a risk of brittleness occurring may be high, and a quality of continuous casting may be degraded due to excessive precipitation of AlN, or the like. Thus, an upper limit is preferably limited to 0.02%.

The remainder of the present disclosure is iron (Fe). However, in a steel manufacturing process according to the related art, impurities, not intended, may be inevitably incorporated from a raw material or a surrounding environment, so such impurities cannot be excluded. All of these impurities are not specifically described in this specification, as they are commonly known to those skilled in the art of steelmaking.

In this case, in addition to the alloy composition described above, one or more among Ti: 0.1% or less (excluding 0%), Nb: 0.1% or less (excluding 0%), V: 0.2% or less (excluding 0%), and Mo: 0.5% or less (excluding 0%) may be further included.

Titanium (Ti): 0.1% or Less (Excluding 0%)

Titanium (Ti) is a fine carbide-forming element, and contributes to securing strength according to the present disclosure. In addition, Ti, a nitride forming element, has an advantage of precipitating N in steel as TiN and scavenging to suppress precipitation of AlN, thereby reducing a risk of cracking during casting. Thus, it is more preferable to add 48/14*[N] or more in terms of chemical equivalent. If the content of Ti exceeds 0.1%, precipitation of coarse carbides and a reduction in an amount of carbon in steel may cause a decrease in strength, and nozzle clogging during casting may also be caused. Thus, the content of Ti is preferably limited to 0.1% or less.

Niobium (Nb): 0.1% or Less (Excluding 0%)

Niobium (Nb) is an element segregated in austenitic grain boundaries and inhibiting coarsening of austenite grains during annealing heat treatment and increases strength through formation of fine carbides. If the content of Nb exceeds 0.1%, there may be problems in which precipitation of coarse carbides and a reduction in an amount of carbon in steel may cause a decrease in strength, and costs of alloy iron may be increased by excessive alloy input.

Vanadium (V): 0.2% or Less (Excluding 0%)

Vanadium (V) is an element contributing to an increase in strength by forming a low-temperature precipitate. If the content of V exceeds 0.2%, there may be problems in which precipitation of coarse carbides and a reduction in an amount of carbon in steel may cause a decrease in strength, and costs of alloy iron may be increased by excessive alloy input.

Molybdenum (Mo): 0.5% or Less (Excluding 0%)

Molybdenum (Mo) is effective for increasing hardenability of steel to suppress formation of ferrite, and also has an effect of suppressing formation of ferrite upon cooling after annealing. Moreover, Mo also contributes significantly to an increase in strength through formation of fine carbides. However, if the content of Mo exceeds 0.5%, costs of alloy iron may be increased by excessive alloy input.

Moreover, in addition to the alloy composition described above, one or more between Zr: 0.001% to 0.1% and W: 0.001% to 0.5% may be further included.

Zr and W may be an element effective for precipitation strengthening of a steel sheet and grain refinement, like Ti, Nb, V, and Mo. If the content of each of Zr and W is less than 0.001%, it is difficult to secure the effect described above. On the other hand, if the content of Zr exceeds 0.1% or the content of W exceeds 0.5%, the effect described above may be saturated, manufacturing costs may be increased, and ductility may be lowered due to excessive precipitation.

Moreover, in addition to the alloy composition described above, one or more among Ni: 1% or less (excluding 0%), Cu: 0.5% or less (excluding 0%), and Cr: 1% or less (excluding 0%) may be further included.

Ni, Cu, and Cr are elements contributing to stabilization of retained austenite, and react in combination with C, Si, Mn, Al, or the like, described above, to contribute to stabilization of austenite. However, if Ni exceeds 1%, Cu exceeds 0.5%, or Cr exceeds 1%, an increase in manufacturing costs may become excessive. Thus, the upper limit thereof is limited.

Meanwhile, in the case of Cu, brittleness may be caused during hot rolling. Thus, when Cu is added, it is preferable that Ni is added together therewith.

Further, in addition to the alloy composition described above, one or more among Sb: 0.1% or less (excluding 0%), Ca: 0.01% or less (excluding 0%), and B: 0.01% or less (excluding 0%) may be further included.

Sb has an effect of inhibiting movement of a surface oxidation element such as Si, Al, or the like, through grain boundary segregation to improve plating surface quality. If the content of Sb exceeds 0.1%, a problem in which alloying of a zinc plated layer is delayed may occur.

Ca is an element effective for improving workability by controlling a form of a sulfide. However, if the content of Ca exceeds 0.01%, the effect described above may be saturated, so it is preferable that Ca is added in an amount of 0.01% or less.

B has an advantage of improving quenching properties due to a combined effect with Mn, Cr, or the like, to suppress transformation of soft ferrite upon cooling at a high temperature. However, if the content of B exceeds 0.01%, when it is manufactured as a plated steel sheet, an excessive amount of B may be concentrated on a surface, which may lead to deterioration of plating adhesion. Thus, it is preferably to be added in an amount of 0.01% or less.

Hereinafter, a microstructure according to the present disclosure will be described in detail.

A microstructure of a steel sheet according to the present disclosure may include, by volume fraction, retained austenite of 12% or more and annealed martensite of 60% or more.

The alloy composition and the microstructure, described above, are satisfied. Thus, while tensile strength is 980 MPa or more, yield strength is excellent, so a yield ratio of 0.75 or more may be secured, and the product of tensile strength and elongation of 23,000 MPa % or more may be also secured.

If retained austenite is less than 12 vol % or annealed martensite is less than 60 vol %, it may be difficult to secure all of the tensile strength, the yield ratio, and the product of tensile strength and elongation, described above.

In this case, the balance, except for the retained austenite and the annealed martensite, may be formed of other inevitable phases including alpha martensite and epsilon martensite. Moreover, a volume fraction of the other inevitable phases may be 28% or less.

Moreover, a steel sheet according to the present disclosure may have a wave height (WH) value, indicating shape properties, of 5 mm or less.

Referring to FIG. 1, a schematic view illustrating a shape of a steel sheet, $P_n$ is a distance between adjacent peaks, and $H_n$ indicates a height difference between a line connecting the peaks and a valley. Here, the wave height (WH) value represents a maximum H value (mm) per 1000 mm, a length in a rolling direction of a steel sheet.

If the wave height (WH) value exceeds 5 mm, a shape is poor, so a problem in which it is difficult to perform press forming may occur.

Further, a steel sheet according to the present disclosure may be one among a cold-rolled steel sheet, a hot-dip plated steel sheet, and an alloyed hot-dip plated steel sheet.

For example, the cold-rolled steel sheet is immersed in a plating bath such as Zn, Zn—Al, Al—Si, Al—Si—Mg, Zn—Mg—Al, or the like, so the hot-dip plated steel sheet may be obtained. Moreover, the hot-dip plated steel sheet is alloying heat treated, so the alloyed hot-dip plated steel sheet may be obtained.

A steel sheet according to the present disclosure may secure high yield strength, and a final product having higher yield strength may be manufactured due to work hardening by cold press forming. Thus, yield strength, similar to yield strength of a product manufactured using hot press forming, may be secured, and the product of tensile strength and elongation is 23,000 MPa % or more. In this regard, elongation is sufficient even after cold press forming. Thus, as compared to a hot press forming component with an elongation of 10% or less, absorbability of impact energy is significantly excellent after manufacturing a component.

Moreover, shape properties are excellent and cold press forming workability is also excellent, and cold press forming is able to be applied, so the generation of $CO_2$, caused during high-temperature forming, may be suppressed. Thus, as compared to hot press forming steel, it is an eco-friendly material and may contribute to global environmental conservation.

Hereinafter, a method for manufacturing an ultrahigh-strength high-ductility steel sheet having excellent yield strength, according to another aspect of the present disclosure, will be described in detail.

Another aspect of the present disclosure, a method for manufacturing an ultrahigh-strength high-ductility steel sheet having excellent yield may includes: heating a slab satisfying the alloy composition described above within a temperature range of 1100° C. to 1300° C.; obtaining a hot-rolled steel sheet by hot finish rolling the heated slab within a temperature range of Ar3 to 1000° C.; coiling the hot-rolled steel sheet at a temperature of 720° C. or less; heat-treating the coiled hot-rolled steel sheet for 30 minutes or more within a temperature range of Ac1 to Ac1+(Ac3−Ac1)/2; obtaining a cold-rolled steel sheet by cold rolling the heat-treated hot-rolled steel sheet; primary annealing for cooling after the cold-rolled steel sheet is maintained at a temperature of Ac3 or more for 30 seconds or more; and secondary annealing for cooling after the primary annealed cold-rolled steel sheet is maintained within a temperature range of 580° C. to Tmax for 10 seconds to 5 minutes.

Here, $Tmax=667.64+129.1C−6.51Mn+38.52Si+29.3Al^{1.6}$ is satisfied, and, in the formula, each element symbol represents the content of each element in wt %.

Slab Heating

A slab, satisfying the alloy composition described above, is heated within a temperature range of 1100° C. to 1300° C.

If a slab heating temperature is less than 1100° C., a problem in which hot rolling load is rapidly increased may occur. If the slab heating temperature exceeds 1300° C., an amount of surface scale is increased, leading to loss of a material. If a large amount of Mn is included, a liquid phase may be provided. Thus, the slab heating temperature is preferably limited to 1100° C. to 1300° C.

Hot Rolling

The heated slab is hot finish rolled within a temperature range of Ar3 to 1000° C. to obtain a hot-rolled steel sheet.

If a hot finish rolling temperature is less than Ar3 (a temperature at which ferrite begins to appear when cooling austenite), rolling of a two phase region, ferrite+austenite, or a ferrite region, is performed, so a duplex grain structure may be formed. Moreover, due to fluctuation of hot rolling load, a malfunction may be caused. Thus, it is not preferable. Meanwhile, if the hot finish rolling temperature exceeds 1000° C., a surface defect by scale may be caused. Thus, it is not preferable.

Coiling

The hot-rolled steel sheet is coiled at a temperature of 720° C. or less.

If a temperature during coiling exceeds 720° C., an oxide film on a surface of a steel sheet may be excessively formed, so a defect may be caused. Thus, an upper limit of the temperature during coiling is preferably limited to 720° C.

As a coiling temperature is lowered, strength of a hot-rolled steel sheet is increased. Thus, there may be a disadvantage in that rolling load of cold rolling, a subsequent process, is increased. However, in the present disclosure, heat treatment is performed before cold rolling, so the disadvantage described above is not significant. Thus, a lower limit of a cooling temperature is not particularly limited. However, in the case in which a rolling ability of a cold rolling mill is excellent or in the case of a reversible mill, heat treatment before cold rolling may not be required.

Heat Treating

The coiled hot-rolled steel sheet is heat treated for 30 minutes or more within a temperature range of Ac1 to Ac1+(Ac3−Ac1)/2.

Ac1 is a temperature at which austenite begins to appear when a temperature is raised from a low temperature, and Ac3 is a temperature at which austenite becomes 100% when a temperature is increased. Ac1 and Ac3 are not a phase equilibrium temperature, but a temperature considering kinetic of phase transformation when a temperature is actually increased.

Figure 2:
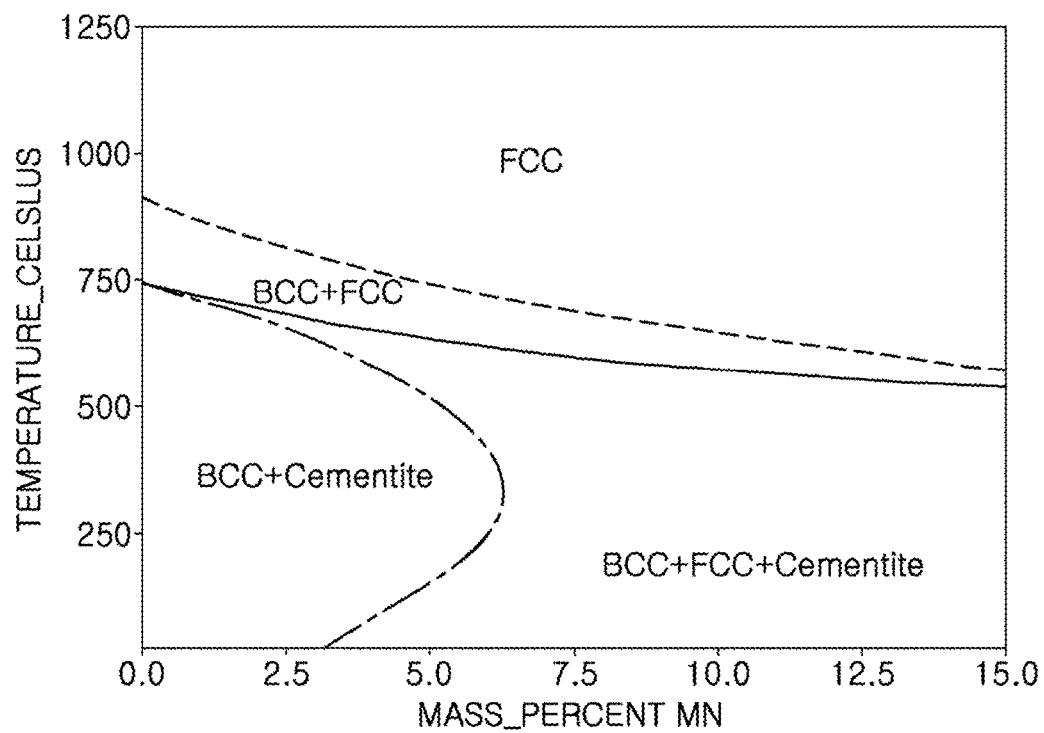
FIG. 2 is an equilibrium state diagram of 0.14C-7Mn-1Si steel, calculated using Thermo-Calc, a thermodynamic calculation program offered by Thermo-Calc Software.

As shown in FIG. 2, Ac1 is changed depending on an amount of Mn, so heat treatment at a proper temperature is required to lower cold rolling strength.

In the present disclosure, due to a large amount of Mn contained in steel, a large amount of martensite is formed after hot rolled coiling, and some austenite due to high alloy may be present. When the hot-rolled steel sheet is heated, strength may be lowered by tempering of martensite. In this regard, only tempering has a limitation in effectively lowering strength. Thus, when heat treatment is performed at Ac1 or more, austenite additionally appears, while carbon effectively moves from martensite, a BCC structure, to austenite, and strength is then lowered. However, if a heat treatment temperature is significant, an excessive amount of austenite appears. Here, the excessive amount of austenite may be transformed to a large amount of martensite during cold rolling, so there may be a disadvantage in that cold rolling load may be rather significant. Thus, in the present disclosure, before cold rolling after coiling is performed, heat treatment before cold rolling is preferably performed within a temperature range of Ac1 to Ac1+((Ac3−Ac1)/2).

Cold Rolling

The heat-treated hot-rolled steel sheet is cold rolled to obtain and a cold-rolled steel sheet. In this case, before cold rolling, a pickling treatment is performed to remove an oxide layer.

In the conventional case, recrystallization behavior during annealing is different depending on a cold reduction rate. Thus, a lower limit of a cold reduction rate is required to be defined. However, in the present disclosure, when primary annealing heat treatment before final (secondary) annealing, that is, austenite single phase annealing is performed at Ac3 or more, it is not required to specifically limit a cold reduction rate.

Primary Annealing

The cold-rolled steel sheet is maintained for 30 seconds or more at a temperature of Ac3 or more, and then primary annealing for cooling is performed.

In this regard, because a phase, as martensite and retained austenite, is secured before final (secondary) annealing, and hardness variation between phases, occurring by recrystallization of transformed annealed martensite of a cold rolled specimen during final annealing in two phase regions is suppressed.

Meanwhile, even when heat treatment is performed at Ac3 or more during actual heat treatment, annealing of two phase regions, in which a significantly small amount of annealed martensite remains, may be performed due to a kinetics problem. However, there is no significant effect on final material properties.

Secondary Annealing

The primary annealed cold-rolled steel sheet is maintained for 10 seconds to 5 minutes within a temperature range of 580° C. to Tmax, and then secondary annealing for cooling is performed. In this regard, because strength, ductility, shape properties are simultaneously secured.

Here, Tmax=667.64+129.1C−6.51Mn+38.52Si+29.3Al$^{1.6}$, and in the formula, each element symbol represents the content of each element in wt %.

If a temperature is less than 580° C. during the secondary annealing heat treatment, austenite is not formed sufficiently, so there may be a problem in which strength and ductility are not stably secured. On the other hand, if the temperature exceeds Tmax during the secondary annealing heat treatment, there may be a problem in which it is difficult to secure a yield ratio of 75% or more.

$$Tmax=667.64+129.1C-6.51Mn+38.52Si+29.3Al^{1.6}$$

Here, in the formula, each element symbol represents the content of each element in wt %.

Tmax is a relational expression, cited in the doctoral thesis by Se-Woong Lee, Graduate Institute of Ferrous Technology of POSTECH, 2015, p. 184. In the thesis, it is derived as a temperature for securing a maximum amount of retained austenite, but the present inventors confirmed that it is also used for a maximum heat treatment temperature capable of securing a yield strength of 75% or more. Thus, it is set as an upper limit of a secondary annealing heat treatment temperature.

If the holding time during the secondary annealing heat treatment is less than 10 seconds, a sufficient heat treatment effect may not be secured. If the holding time exceeds five minutes, meandering of a steel sheet may occur, and it may be difficult to perform secondary annealing in a continuous production line.

In this case, the secondary annealing may be performed in a continuous annealing line.

When types of steel, containing a large amount of Mn, is heat treated for a long time, for example, 30 minutes or more, during final annealing, balance of excellent tensile strength and elongation may be obtained. However, a practical method to perform heat treatment for a long time is not a method using a conventional continuous annealing line, but a batch annealing method for heat treatment of a coil. When heat treatment is performed using the batch annealing method, curvature may occur in a rolling longitudinal direction after heat treatment. Moreover, a wave height (WH) value exceeds 5 mm, so a shape of a steel sheet may be degraded. Thus, a problem in which it is difficult to perform press forming may occur.

Thus, for secondary (final) annealing according to the present disclosure, it is preferable to perform heat treatment for a short time in a continuous annealing line.

Meanwhile, forming a plating layer by immersing the secondary annealed cold-rolled steel sheet into a plating bath may be further included. For example, the annealed cold-rolled steel sheet is immersed in a plating bath such as Zn, Zn—Al, Al—Si, Al—Si—Mg, Zn—Mg—Al, or the like, so a plating layer may be formed.

In this case, after the plating layer is formed, forming an alloyed plating layer by additionally performing alloying heat treatment may be further included. For example, the alloying heat treatment may be performed within a temperature range of 480° C. to 600° C.

MODE FOR INVENTION

Hereinafter, the present disclosure will be described in more detail with reference to Examples. It should be noted, however, that the embodiments described below are for the purpose of illustrating the present disclosure and are not intended to limit the scope of the present disclosure, since the scope of the present disclosure is determined by the matters described in the claims and matters able to be reasonably deduced therefrom.

Steel, having a composition of Table 1, was vacuum-melted from 30 kg of ingots, and then the steel was maintained for 1 hour at a temperature of 1200° C. Then, hot rolling was performed, and finish rolling was completed at 900° C. Then, the steel was charged in a furnace pre-heated at 600° C. and maintained for 1 hour, and hot rolled coiling was simulated by furnace-cooling. Then, the specimen, cooled to room temperature, was heat treated for 10 hours at 600° C., and pickling and 50% cold rolling were performed.

The cold rolled specimen was heat treated under conditions in Table 2, and mechanical properties of each specimen were measured and are illustrated in Table 2.

In Table 1, the content of each element was indicated by wt %.

In Table 2, YS (Yield Strength) indicates yield strength, TS (Tensile Strength) indicates tensile strength, El (Elongation) indicates elongation, and YR (Yield Ratio, YR (%)=YS/TS*100) indicates a yield ratio.

Moreover, in Table 2, Tmax=667.64+129.1C−6.51Mn+38.52Si+29.3Al$^{1.6}$, in the formula, each element symbol represents the content of each element in wt %.

TABLE 1

| STEEL | C | Si | Mn | Al | Ti | Nb | V | Mo | P | S | N | Si + Mn |
|---|---|---|---|---|---|---|---|---|---|---|---|---|
| COMPARATIVE STEEL 1 | 0.18 | 1.46 | 2.59 | 0.501 | 0.02 | 0 | 0 | 0 | 0.01 | 0.0056 | 0.0044 | 4.05 |
| COMPARATIVE STEEL 2 | 0.174 | 1.5 | 3.36 | 0.031 | 0 | 0 | 0 | 0 | 0.011 | 0.002 | 0.0058 | 4.86 |
| COMPARATIVE STEEL 3 | 0.11 | 0 | 5.01 | 0.031 | 0 | 0 | 0 | 0 | 0.009 | 0.0062 | 0.0065 | 5.01 |
| COMPARATIVE STEEL 4 | 0.1 | 0.5 | 5.06 | 0.026 | 0 | 0 | 0 | 0 | 0.0069 | 0.0057 | 0.0054 | 5.56 |
| INVENTIVE STEEL 1 | 0.14 | 1.11 | 5.01 | 0.031 | 0.06 | 0.04 | 0 | 0.25 | 0.0057 | 0.0045 | 0.0045 | 6.12 |
| INVENTIVE STEEL 2 | 0.12 | 0 | 7.1 | 0.04 | 0.06 | 0 | 0 | 0.251 | 0.0085 | 0.0065 | 0.0063 | 7.1 |
| INVENTIVE STEEL 3 | 0.16 | 1.08 | 6.2 | 0.045 | 0 | 0 | 0.117 | 0 | 0.0061 | 0.0071 | 0.0045 | 7.28 |
| INVENTIVE STEEL 4 | 0.141 | 1.01 | 7.25 | 0.034 | 0.058 | 0.042 | 0 | 0.248 | 0.0064 | 0.0055 | 0.0047 | 8.26 |
| INVENTIVE STEEL 5 | 0.14 | 0.99 | 7.51 | 0.029 | 0.06 | 0.041 | 0 | 0.252 | 0.0085 | 0.0068 | 0.0051 | 8.5 |
| INVENTIVE STEEL 6 | 0.06 | 0 | 8.5 | 0.028 | 0.03 | 0.039 | 0 | 0 | 0.0082 | 0.0063 | 0.0052 | 8.5 |
| INVENTIVE STEEL 7 | 0.08 | 1.02 | 8 | 0.03 | 0 | 0 | 0 | 0 | 0.0077 | 0.0069 | 0.0064 | 9.02 |
| COMPARATIVE STEEL 5 | 0.14 | 1.5 | 9 | 0.025 | 0.061 | 0.041 | 0 | 0.247 | 0.0064 | 0.0082 | 0.0067 | 10.5 |
| COMPARATIVE STEEL 6 | 0.06 | 1.04 | 9.5 | 0.031 | 0 | 0 | 0 | 0 | 0.0054 | 0.0075 | 0.0063 | 10.54 |

TABLE 2

| CLASSIFICATION | STEEL | Tmax (°C.) | PRIMARY ANNEALING TEMPERATURE (°C.) | PRIMARY ANNEALING THE (SECONDS) | SECONDARY ANNEALING TEMPERATURE (°C.) | SECONDARY ANNEALING THE (SECONDS) | YS (MPa) | TS (MPa) | El (%) | TS*El (MPa %) | YR (%) |
|---|---|---|---|---|---|---|---|---|---|---|---|
| COMPARATIVE EXAMPLE 1 | COMPARATIVE STEEL 1 | 740 | 900 | 60 | 830 | 60 | 497 | 1048 | 21.6 | 22637 | 47 |
| COMPARATIVE EXAMPLE 2 | COMPARATIVE STEEL 2 | 726 | 900 | 60 | 790 | 60 | 704 | 1501 | 9.6 | 14410 | 47 |
| COMPARATIVE EXAMPLE 3 | COMPARATIVE STEEL 3 | 648 | 810 | 60 | 640 | 70 | 781 | 854 | 20.7 | 17678 | 91 |
| COMPARATIVE EXAMPLE 4 | COMPARATIVE STEEL 4 | 667 | 810 | 60 | 640 | 70 | 898 | 940 | 18.3 | 17202 | 96 |
| INVENTIVE EXAMPLE 1 | INVENTIVE STEEL 1 | 692 | 810 | 60 | 680 | 70 | 1142 | 1180 | 23.7 | 27966 | 97 |
| COMPARATIVE EXAMPLE 5 | | | 810 | 60 | 700 | 70 | 980 | 1371 | 18 | 24678 | 71 |
| INVENTIVE EXAMPLE 2 | INVENTIVE STEEL 2 | 638 | 810 | 60 | 600 | 70 | 1250 | 1226 | 20.8 | 25501 | 102 |
| INVENTIVE EXAMPLE 3 | | | 810 | 60 | 620 | 70 | 1218 | 1218 | 22.4 | 27283 | 100 |
| INVENTIVE EXAMPLE 4 | INVENTIVE STEEL 3 | 691 | 780 | 90 | 650 | 60 | 1057 | 1191 | 23.4 | 27824 | 89 |
| INVENTIVE EXAMPLE 5 | | | 780 | 90 | 660 | 60 | 1040 | 1203 | 27.3 | 32780 | 86 |
| INVENTIVE EXAMPLE 6 | | | 780 | 90 | 670 | 60 | 1022 | 1249 | 27.1 | 33847 | 82 |
| INVENTIVE EXAMPLE 7 | INVENTIVE STEEL 4 | 679 | 810 | 76 | 630 | 70 | 1197 | 1257 | 24.8 | 31174 | 95 |
| INVENTIVE EXAMPLE 8 | | | 810 | 76 | 650 | 70 | 1148 | 1301 | 24.7 | 32135 | 88 |
| INVENTIVE EXAMPLE 9 | INVENTIVE STEEL 5 | 675 | 800 | 120 | 610 | 120 | 1222 | 1290 | 21 | 27444 | 95 |
| INVENTIVE EXAMPLE 10 | | | 800 | 120 | 630 | 120 | 1251 | 1285 | 25 | 32319 | 97 |
| INVENTIVE EXAMPLE 11 | | | 800 | 120 | 650 | 120 | 1161 | 1344 | 28 | 37148 | 86 |
| COMPARATIVE EXAMPLE 6 | | | 800 | 120 | 680 | 120 | 933 | 1531 | 21 | 31637 | 61 |
| COMPARATIVE EXAMPLE 7 | | | — | — | 680 | 60 | 1252 | 1401 | 14 | 20084 | 89 |
| COMPARATIVE EXAMPLE 8 | | | — | — | 700 | 60 | 788 | 1522 | 11 | 17143 | 52 |
| INVENTIVE EXAMPLE 12 | INVENTIVE STEEL 6 | 620 | 800 | 60 | 600 | 70 | 1157 | 1189 | 22.0 | 26180 | 97 |
| INVENTIVE EXAMPLE 13 | | | 800 | 60 | 620 | 70 | 1057 | 1214 | 20.8 | 25273 | 87 |
| COMPARATIVE EXAMPLE 9 | | | 800 | 60 | 640 | 70 | 890 | 1289 | 17.6 | 22689 | 69 |
| COMPARATIVE EXAMPLE 10 | | | 800 | 60 | 660 | 70 | 621 | 1354 | 16.2 | 21955 | 46 |
| INVENTIVE EXAMPLE 14 | INVENTIVE STEEL 7 | 665 | 800 | 120 | 640 | 120 | 1026 | 1201 | 25 | 30009 | 85 |
| COMPARATIVE EXAMPLE 11 | COMPARATIVE EXAMPLE 5 | 685 | 750 | 60 | 620 | 50 | 1049 | 1535 | 23.2 | 35606 | 68 |
| COMPARATIVE EXAMPLE 12 | | | 750 | 60 | 640 | 50 | 945 | 1578 | 22.6 | 35684 | 60 |

TABLE 2-continued

| | | PRIMARY ANNEALING | | | SECONDARY ANNEALING | | MECHANICAL PROPERTIES | | | | |
| --- | --- | --- | --- | --- | --- | --- | --- | --- | --- | --- | --- |
| CLASSIFI-CATION | STEEL | Tmax (° C.) | TEMPER-ATURE (° C.) | THE (SECONDS) | TEMPER-ATURE (° C.) | THE (SECONDS) | YS (MPa) | TS (MPa) | El (%) | TS*El (MPa %) | YR (%) |
| COMPARATIVE EXAMPLE 13 | | | 750 | 60 | 660 | 50 | 881 | 1654 | 22.8 | 37768 | 53 |
| COMPARATIVE EXAMPLE 14 | COMPARATIVE STEEL 6 | 652 | 810 | 60 | 640 | 70 | 613 | 1405 | 17.7 | 24869 | 44 |

In Inventive examples, satisfying the alloy composition and the manufacturing method proposed in the present disclosure, tensile strength was 980 MPa or more, a yield ratio was 0.75 or more, the product of tensile strength and elongation was 23,000 MPa % or more. Here, excellent mechanical properties were secured.

Comparative Examples 1 and 2, not satisfying both the alloy composition and the manufacturing method proposed in the present disclosure, a high yield ratio was not secured, and the product of tensile strength and elongation was inferior.

In Comparative Steel 3 and 4, in which the content of each element was satisfied, but Si+Mn was less than 4%, as can be seen in Comparative Example 3 and 4, to which the manufacturing conditions proposed in the present disclosure was applied, a high yield ratio was secured, but tensile strength and the product of tensile strength and elongation were inferior.

In Comparative Steel 5 and 6, in which the content of each element was satisfied, but Si+Mn exceeds 10%, as can be seen in Comparative Example 11 to 14, to which the manufacturing conditions proposed in the present disclosure was applied, tensile strength and elongation were significantly excellent, but a high yield ratio was not obtained.

Meanwhile, even when the alloy composition, proposed in the present disclosure, was satisfied, in Comparative Examples 5 to 10, did not satisfy the manufacturing conditions proposed in the present disclosure, a yield ratio was low, or the product of tensile strength and elongation was inferior.

In detail, in the case of Comparative Example 7 and 8, when primary annealing heat treatment was omitted, as compared with the case in which primary annealing heat treatment was performed, the product of tensile strength and elongation was significantly reduced, so cold formability was inferior.

Figure 3:
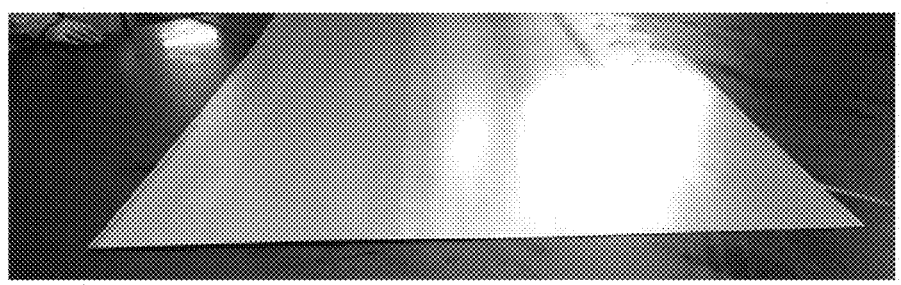
FIG. 3 is images capturing a shape which is finally annealed, (a) of FIG. 3 illustrates Inventive Example 7, heat treated, that is, continuously annealed, and (b) of FIG. 3 illustrates a steel sheet, heat treated, that is, batch annealed.
Figure 3:
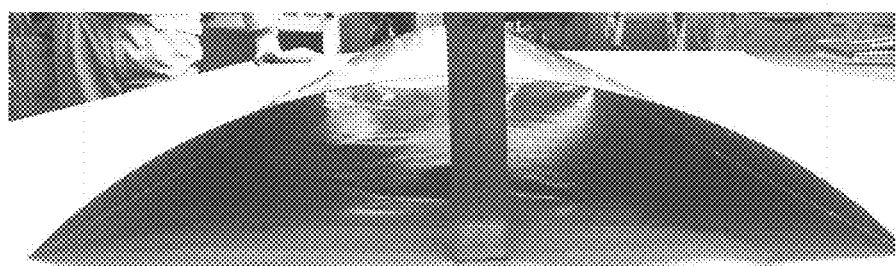

FIG. 3 is images capturing a shape which is finally annealed, FIG. 3A illustrates Inventive Example 7, in which Inventive Steel 4 is heat treated, that is, continuously annealed, and FIG. 3B illustrates a steel sheet, heat treated, that is, batch annealed.

In the case of Inventive Example 7, a WH value was 1 mm, so good shape properties may be secured. However, if heat treatment was performed by batch annealing while other conditions are the same, a WH value was 120 mm, so shape properties were poor, and it was not suitable for press forming.

Figure 4:
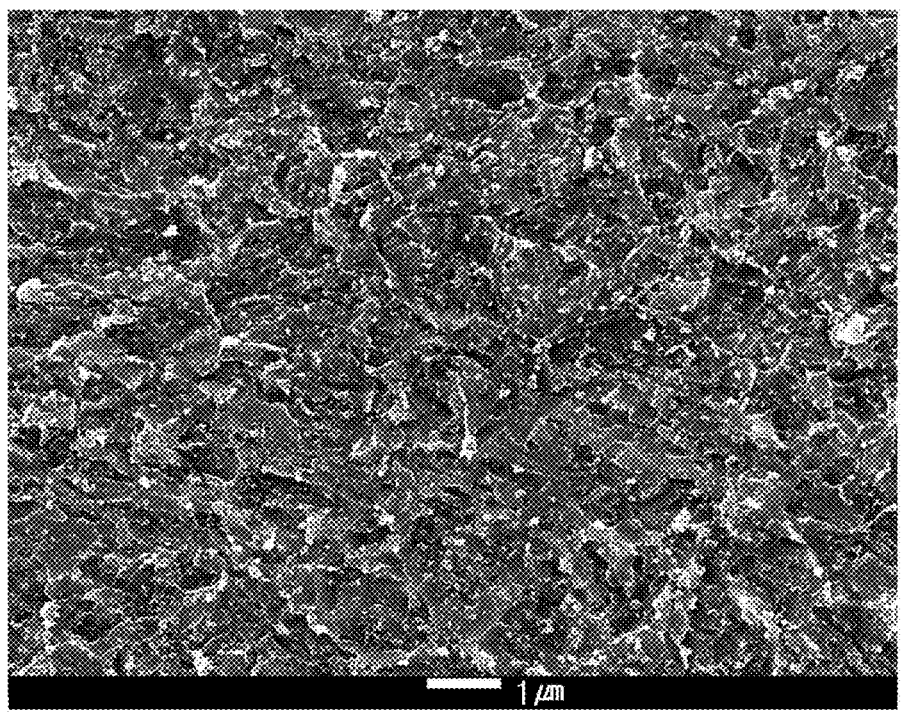
FIG. 4 is an image of a microstructure of Inventive Example 10, captured by a scanning electron microscope.

FIG. 4 is an image in which a microstructure of Inventive Example 10 was taken by a scanning electron microscope. Due to a significantly fine structure, even when a high-resolution scanning electron microscope was used, it was difficult to distinguish each phase. Here, it may be overcome by a diffraction experiment using an X-ray.

Figure 5:
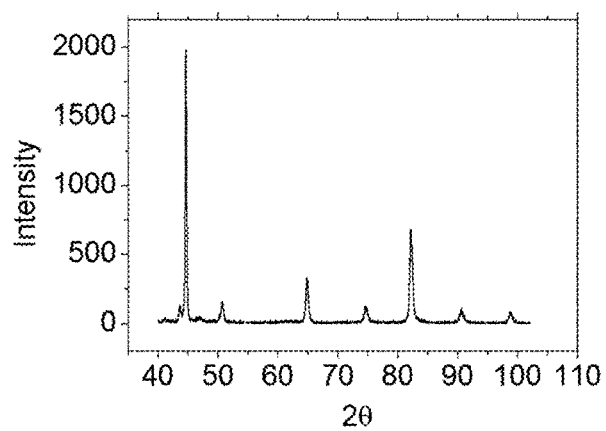
FIG. 5 is a profile measuring an X-ray diffraction peak with a Cu target for phase fraction measurement of Inventive Example 10.

As a Cu target for measuring a phase fraction of Inventive Example 10, in a microstructure of Inventive Example 10 in FIG. 5, a profile, in which an X-ray diffraction peak was measured, retained austenite of 19%, epsilon martensite of 3%, and annealed martensite of 78% were confirmed. Due to a high retained austenite fraction and a fine grain size, high yield strength and ductility may be secured.

Moreover, as a result of X-ray analysis of Inventive Example 2 and 3, in the case of Inventive Example 2, retained austenite of 13%, epsilon martensite of 4%, and annealed martensite of 83% were confirmed. In the case of Inventive Example 3, retained austenite of 16%, epsilon martensite of 5%, and annealed martensite of 79% were confirmed. Here, it was determined that securing of a fine grain size and stable austenite fraction mainly serve to implement high ductility and ultrahigh-strength.

While exemplary embodiments have been shown and described above, it will be apparent to those skilled in the art that modifications and variations could be made without departing from the scope of the present invention as defined by the appended claims.

The invention claimed is:

1. A steel sheet comprising:
   carbon (C): 0.04 wt % to 0.18 wt %, silicon (Si): 2 wt % or less, manganese (Mn): 4 wt % to 10 wt %, phosphorous (P): more than 0% and 0.05 wt % or less, sulfur (S): more than 0% and 0.02 wt % or less, aluminum (Al): more than 0% and 0.5 wt % or less, nitrogen (N): more than 0% and 0.02 wt % or less, and the balance of iron (Fe) and other inevitable impurities, wherein Si+Mn satisfies 6 wt % to 10 wt %; and
   a microstructure including, by volume fraction, retained austenite of 12% or more and annealed martensite of 60% or more,
   wherein the steel sheet has a wave height (WH) value of 5 mm or less.

2. The steel sheet of claim 1, further comprising: one or more among titanium (Ti): more than 0% and 0.1 wt % or less, niobium (Nb): more than 0% and 0.1 wt % or less, vanadium (V): more than 0% and 0.2 wt % or less, and molybdenum (Mo): more than 0% and 0.5 wt % or less.

3. The steel sheet of claim 1, further comprising: one or more between zirconium (Zr): 0.001 wt % to 0.1 wt % and tungsten (W): 0.001 wt % to 0.5 wt %.

4. The steel sheet of claim 1, further comprising: one or more among nickel (Ni): more than 0% and 1 wt % or less, copper (Cu): more than 0% and 0.5 wt % or less, and chrome (Cr): more than 0% and 1 wt % or less.

5. The steel sheet of claim 1, further comprising: one or more among antimony (Sb): more than 0% and 0.1 wt % or less, calcium (Ca): more than 0% and 0.01 wt % or less, and more than 0% and boron (B): 0.01 wt % or less.

6. The steel sheet of claim 1, wherein the microstructure further includes inevitable phases including alpha martensite and epsilon martensite, and the inevitable phases is 20% or less by volume fraction.

7. The steel sheet of claim 1, wherein the steel sheet has a tensile strength of 980 MPa or more, a yield ratio of 0.75 or more, and a product of tensile strength and elongation of 23,000 MPa % or more.

8. The steel sheet of claim 1, wherein the steel sheet is one among a cold-rolled steel sheet, a hot-dip plated steel sheet, and an alloyed hot-dip plated steel sheet.

* * * * *